July 26, 1938.   E. C. SMITH   2,124,658
BOLT CONSTRUCTION
Filed Oct. 4, 1937
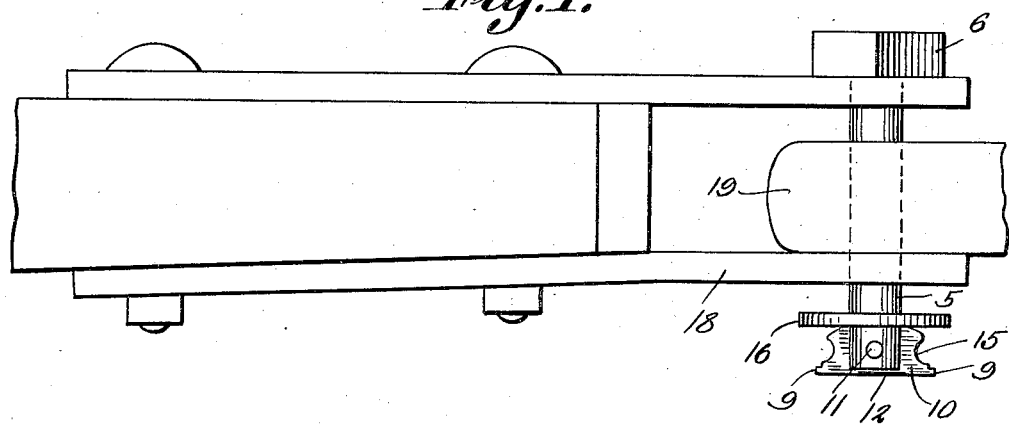
Fig. 1.
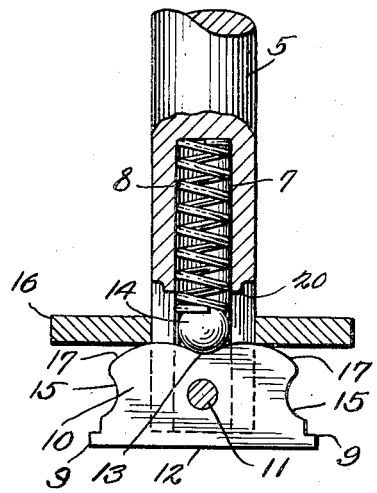 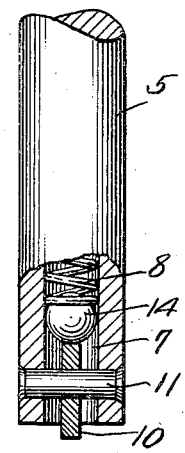 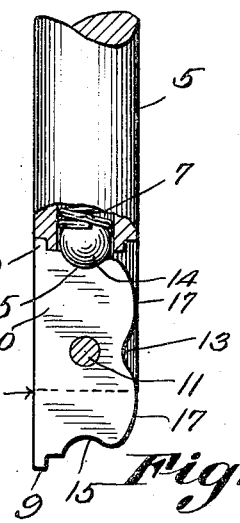
Fig. 2.   Fig. 3.   Fig. 4.
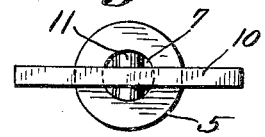
Fig. 5.
E. C. Smith
INVENTOR.
BY C. A. Snow & Co.
ATTORNEYS.

Patented July 26, 1938

2,124,658

UNITED STATES PATENT OFFICE 2,124,658

BOLT CONSTRUCTION

Elmer C. Smith, Plainview, Tex., assignor of one-half to Clyde B. Hackleman, Plainview, Tex.

Application October 4, 1937, Serial No. 167,295

1 Claim. (Cl. 85—3)

This invention relates to bolt construction, the primary object of the invention being to provide a bolt designed primarily for use with trailer hitches, which will not become accidently displaced when the opening of the washer, forming a part of the bolt securing means, becomes worn to an oval formation.

Another important object of the invention is to provide a bolt locking means including a locking member normally held in its active position without the use of cotter-keys, threaded nuts or the like, due consideration being given to the strength and durability of the bolt.

With the foregoing and other objects in view, which will appear as the description proceeds, the invention resides in the combination and arrangement of parts and in the details of construction hereinafter described and claimed, it being understood that changes in the precise embodiment of the invention hereindescribed, may be made within the scope of what is claimed, without departing from the spirit of the invention.

Referring to the drawing:

Figure 1 is an elevational view illustrating the application of the bolt as used with a trailer hitch.

Figure 2 is a sectional view through the locking end of the bolt.

Figure 3 is a sectional view through the locking end of the bolt taken at right angles to Figure 2.

Figure 4 is a sectional view through the locking end of the bolt showing the locking member in its inactive position.

Figure 5 is an end elevational view of the locking end of the bolt.

Referring to the drawing in detail, the blot is indicated by the reference character 5, and as shown the bolt is formed with a head 6 at one end thereof, the opposite end of the bolt being formed with a longitudinal slot extending inwardly from the end. The bolt 5 is also formed with a bore 7 extending inwardly from the end thereof, the bore extending an appreciable distance beyond the inner end of the slot, providing a housing for the coiled spring 8 which substantially fills the bore.

At the inner end of the slot, are lugs 20 providing stops to be engaged by the lugs 9 formed at the ends of the pivoted locking member 10 which is in the form of an elongated plate of a thickness to closely fit within the slot.

As shown this member 10 is mounted on the pin 11 extending transversely through the locking end of the bolt. One of the edges of the member 10 is straight as at 12, and is adapted to lie flush with the surface of the bolt when the member 10 has been moved to its inactive position whereby the bolt may be readily removed, without the use of tools.

The opposite side edge of the member 10 is formed with a depression 13, curved to receive the steel ball 14 that is held in one end of the coiled spring 8 which is urged into the depression by said spring. In the ends of the member 10, are depressions 15 which are also constructed to receive the ball 14, so that when the member 10 has been moved to the position shown by Figure 4, the member 10 will be held in such position until forcibly moved to its locking position.

A washer indicated by the reference character 16 forms a part of the bolt structure and is positioned over the bolt when the member 10 has been moved to the position shown by Figure 4, whereupon the locking member 10 is moved to its locking position as shown by Figure 2, securely holding the bolt in position, against accidental displacement.

It might be further stated that the edges of the member 10 are curved as at 17, whereby the locking member 10 may be readily rotated as described.

In the present showing the bolt has been illustrated as connecting the members 18 and 19 of a trailer hitch, however it is to be understood that the bolt is not restricted solely to this use but may be used at any place wherein a bolt of this type is desirable.

I claim:

A bolt of the class described, comprising a body portion having a bore extending inwardly from one end thereof, and having a slot formed in the wall of the bore, lugs on the bolt adjacent to the inner end of the slot, a locking member pivotally mounted within the slot, lugs at the ends of the locking member and adapted to engage the first mentioned lugs, restricting movement of the locking member, and a washer on the bolt and held in position on the bolt.

ELMER C. SMITH.